INVENTORS
EARL E. SUTTON
BY PIERRE L. CREASE

ATTORNEYS

Nov. 20, 1962

P. L. CREASE ET AL 3,065,326

ELECTRICALLY HEATED COOKING DEVICE

Filed Dec. 14, 1960

INVENTORS
EARL E. SUTTON
PIERRE L. CREASE
BY
ATTORNEYS

Nov. 20, 1962  P. L. CREASE ET AL  3,065,326
ELECTRICALLY HEATED COOKING DEVICE
Filed Dec. 14, 1960  3 Sheets-Sheet 3

INVENTORS
EARL E. SUTTON
BY PIERRE L. CREASE
ATTORNEYS

United States Patent Office 3,065,326
Patented Nov. 20, 1962

3,065,326
ELECTRICALLY HEATED COOKING DEVICE
Pierre L. Crease, Akron, and Earl E. Sutton, Mansfield, Ohio, assignors to Dominion Electric Corporation
Filed Dec. 14, 1960, Ser. No. 75,730
8 Claims. (Cl. 219—35)

Our invention relates to cooking devices of the type heated by electrical resistance means.

An object of our invention is to provide an improved cooking device which may be utilized in a number of ways and having a structure which may be selectively varied in arrangement.

Another object is the provision of a cooking device which may be varied in structure to accommodate itself to a baking oven, to a broiler, and to a grill.

Another object is the provision in a heating device having an electrical resistance element which may be inverted to alternative positions to permit the device to be used for alternative cooking purposes, such as a broiler and as a grill.

Another object is the provision of a cooking device having a housing readily convertible from an enclosed oven to an open grill.

Another object is the provision of a cooking device having a two-part housing wherein the upper part may be readily added to or removed from the lower part so as to convert the cooking device to different uses.

Another object is the provision of a unique structure so arranged and formed as to provide different and improved results in a heretofore unknown manner.

Another object is the provision of a unique structure operating in a unique manner to provide new and important results.

Other objects and a fuller understanding of the invention may be had by referring to the following description and claims, taken in conjunction with the accompanying drawings, in which:

Figure 1:
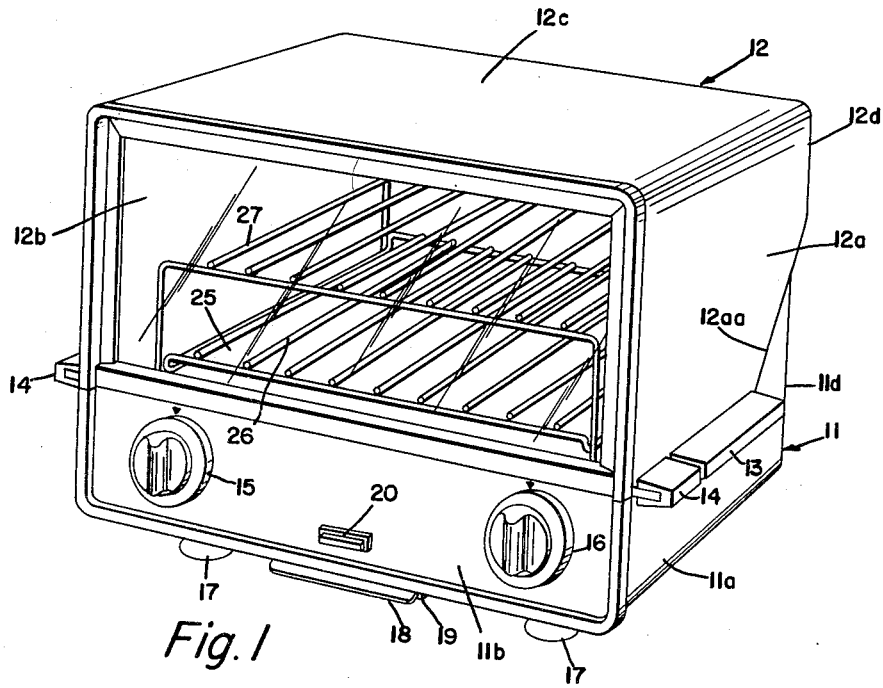
FIGURE 1 is a perspective view of our cooking device arranged as an oven with the cover closed.

Our cooking device has a housing made up of lower housing part 11 and upper housing part 12. These housing parts are made of spaced sheet metal sandwiched with heating insulation means 23 for the purpose of retaining heating within the enclosed space within the housing.

The lower housing part 11 has spaced side walls 11a, a front wall 11b, a bottom wall 11c and a rear wall 11d. The rear wall 11d extends upwardly somewhat higher than the side walls 11a and a slanted or sloped portion 11aa extends downwardly from the top of the rear wall 11d to the tops of the respective side walls 11a.

The upper housing part 12 has spaced side walls 12a, a front wall 12b, a top wall 12c and a rear wall 12d. The rear wall 12d does not extend downwardly as far as the side walls 12a and a slanted or sloped portion 12aa extends downwardly and forward from the rear wall 12d to the bottom edge of the respective side walls 12a. The side walls 12a of the upper housing part 12 are spaced apart somewhat farther than are the spaced side walls 11a of the lower housing part 11 so that the side walls 12a of the upper housing part 12 are adjacent and disposed outwardly of the side walls 11a of the lower housing part 11, thus permitting clearance by the side walls 12a of the side walls 11a upon swinging of the upper housing part 12 relative to the lower housing part 11.

Secured to and extending from the side walls 11a of the lower housing part 11 are handles 13, preferably having a heat insulating knob so as to permit the manual grasping of the handles 13 although the metal parts of the cooking device may be heated. Secured to and extending outwardly from the side walls 12a of the upper housing part 12 are handles 14 which similarly have heat insulating material on the surface thereof for being manually grasped. By lifting on the handles 14, the entire cooking device may be raised. By lifting on the handles 14, the upper housing part 12 may be raised and swung backwardly relative to the lower housing part 11.

Figure 5:
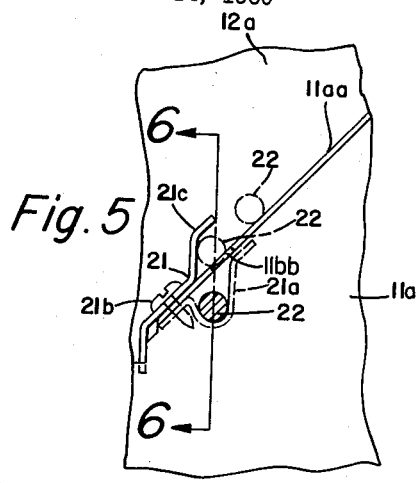
FIGURE 5 is an enlarged detailed view showing the means for mounting the upper cover part to the lower cover part.

A unique hinged arrangement is provided for connecting the upper housing part 12 to the lower housing part 11. Carried by and extending inwardly of the side walls 12a of the upper housing part 12 adjacent the juncture of the lower edge of the side walls 12a and of the sloping or slanted portion 12aa are pivot pins 22. These pivot pins 22, better seen in FIGURES 5 and 6, extend toward each other so as to be over the slanted or sloped portion 11aa, respectively. Mounted to each sloping part 11aa of the spaced side walls 11a are open-throated hinged elements 21 which are secured by screws 21b to the slanted portion 11aa near the juncture of the portion 11aa and the horizontal top of the walls 11a. Each open-throated hinge element 21 has an upper portion 21c which is offset from the plane of the slanted portion 11aa, as seen in FIGURE 5. Each open-throated hinge also has a lower or dwell part 21a which is formed in the wall 11a and extends downwardly from the plane of the slanted portion 11aa.

The pins 22 are adapted to be accommodated in the hinge elements 21 so as to provide a pivot connection between the upper housing part 12 and the lower housing part 11 to connect the upper housing part 12 to the lower housing part 11. The upper housing part 12 is positioned above the lower housing part 11 with the pins 22 resting on the slanted or sloped portion 11aa, preferably with the upper housing part 12 tipped upright and the lower housing part 11 disposed horizontally. The first position of the pins 22 in the assembling operation is shown in dotted lines in FIGURE 5 in the position shown to the right of the hinge element 21 By sliding the pins 22 downwardly along the sloped portions 11aa, the pins 22 then enter under the offset portion 21c of the hinge elements to the position indicated by dotted lines to the left in FIGURE 5. By then moving the pins 22 downwardly from the plane of the sloping portions 11aa down into the dwell portion 21a, the pins 22 are lowered to the position shown in full lines in FIGURES 5 and 6 where they are held by gravity and the snug embrace of the portion 21a of the hinge element 21.

Figure 6:
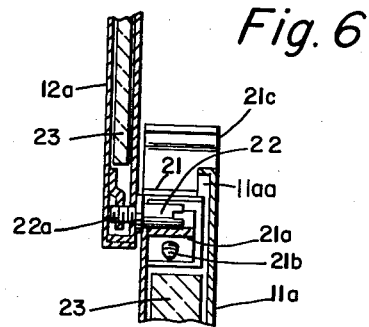
FIGURE 6 is a sectional view taken through the line 6—6 of FIGURE 5.

The sloping portion 11aa is cut away at 11bb to permit the respective pins 22 to move downwardly through the plane of each sloping portion 11aa to the position shown in full lines in FIGURES 5 and 6.

After the respective pins 22 are in the lower position illustrated in FIGURES 5 and 6, then there is a hinged connection between the upper housing part 12 and the lower housing part 11. This hinged connection may be dismantled by raising the upper housing part 12 to disengage the pins 22 from the respective hinge housings 21. In other words, the hinged connection may be disassembled by reversing the movement of the parts previously described. The pivot pins 22 are secured to the wall 12a by the threaded end 22a of the respective pivot pins 22 being threadably engaged in reinforcing lugs in the side walls 12a as illustrated in FIGURE 6.

The front wall 12b of the upper housing part 12 is preferably made of heat-resistant glass in the form of a panel retained in a frame carried by the side walls 12a and the top wall 12c. By means of the transparent glass panel 12b, the interior of the cooking device may be viewed from outside while the cooking device is in the closed position illustrated in FIGURE 1.

Extending out from the front wall 11b of the lower housing part 11 on the left side thereof is a temperature setting dial and switch 15 used for turning off and on the electric current to the heating element and for setting a thermostat control governing the temperature for the cooking device. Extending out from the right of the front wall 11b is a timer 16 whose mechanism within the housing sets the cooking time to a suitable timing mechanism. By means of adjusting the knob of the temperature dial 15 and of the timer 16, the desired cooking conditions in the device may be set.

An indicator light 20 mounted on the front wall 11b is connected with the electrical circuit of the cooking device so as to visibly indicate when the current is on or off. There are four legs 17, preferably made of heat-insulated material, secured to the bottom wall 11c for supporting the cooking device.

A convenient cooking chart printed on an instruction plate 18 is mounted below the bottom wall 11c by spaced slides 19 so arranged that the instruction plate 18 may be manually moved outwardly for the reading of the cooking instructions printed on the top surface of the plate 18.

Carried by spaced side walls 11a and extending inwardly toward each other are channel support members 24. The inner opposed edges of the channel support members 24 have facing grooves which slidably receive side bars 25a attached to the side walls of a cooking pan 25. By this sliding inner engagement of the bars 25a in the opposed grooves of the channel support members 24, a pan 25 may be slid inwardly and outwardly of the device. Mounted upon the top surface of the pan 25 is a lower grill 26 which has along its opposite side edges grooved portions 26a which slidably embrace the top side edges of the pan 25 in such manner as to permit the sliding of the lower grill 26 forwardly and rearwardly on the top of the pan 25.

Also carried by the channel support members 24 is an upper grill 27 which has a major portion disposed in a vertical plane and side upright portions extending downwardly to the channel support members 24. The lower ends of the side portions of the upper grill 27 are bent outwardly to form offset portions 27a which slidably engage in the upper grooves, respectively, formed in the channel support members 24. Thus, the upper grill 27 may be slid forwardly and rearwardly in the cooking device and retained in position relative to the lower grill 26 by the sliding interengagement of the offset portions 27a in the laterally extending grooves in the upper portions of the channel support members 24.

Figure 2:
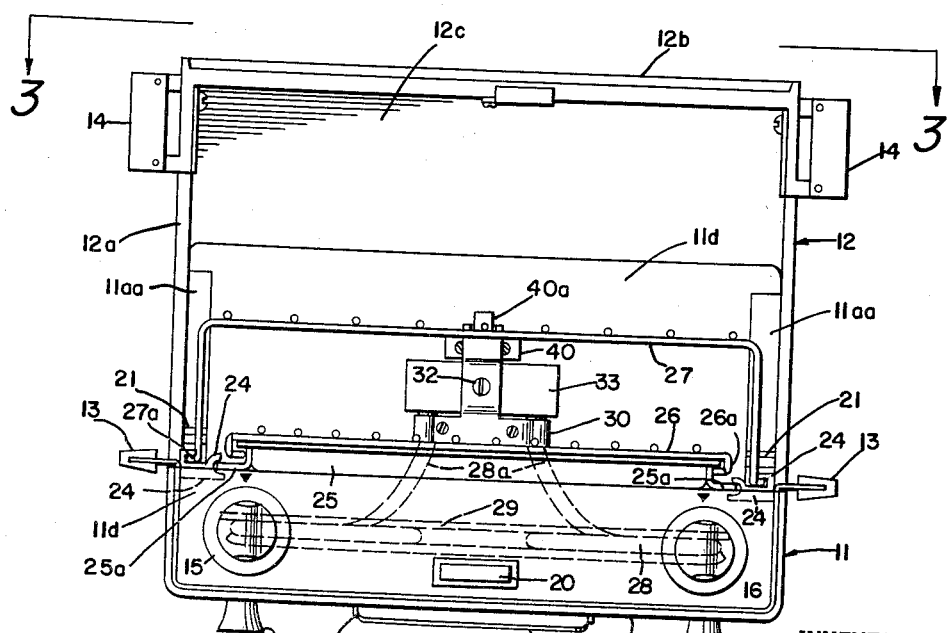
FIGURE 2 is a front view of our cooking device with the cover raised.
Figure 3:
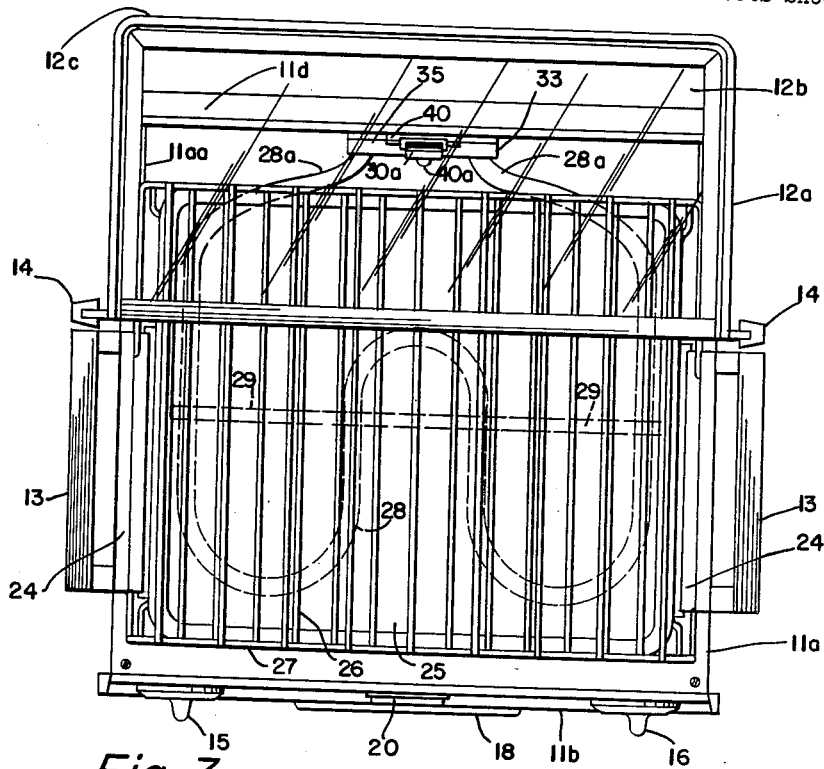
FIGURE 3 is a plan view of our cooking device with the cover raised.
Figure 4:
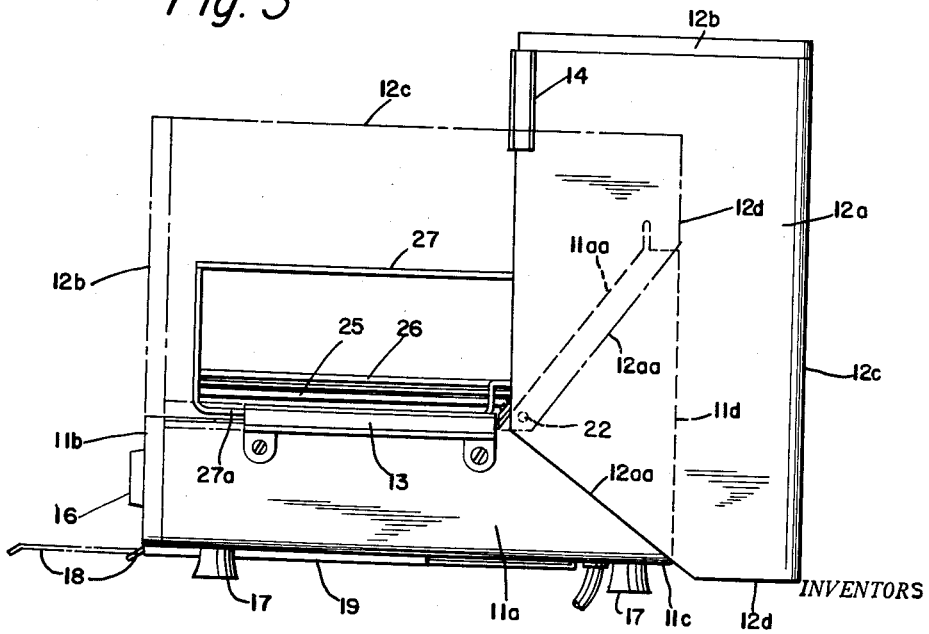
FIGURE 4 is a right-hand view of our cooking device shown with the cover swung to open position.

For heating the cooking device there is provided an electrical heating resistance element 28 which has a usual cross-sectional structure of a resistance wire embedded in ceramic material, which in turn is enclosed in a metallic sheath. The heating element 28 has its major portion disposed in a flat plane which, when incorporated in the cooking device, is in a horizontal plane. The configuration of the sinuous disposition of the major portion of the heating element 28 in a horizontal plane is illustrated in FIGURE 3. The terminal portions of the heating element 28 are bent at substantially right angles to the plane of the major portion of the heating element to form angle portions 28a. These angle portions 28a are disposed generally in a plane at right angles to the major portion of the heating element. Also the ends of the angle portions 28a extend toward each other and end in spaced relationship and substantially parallel to each other, as seen in FIGURES 2 and 3. A spacer bar 29 holds the sinuous portions of the heating element 28 in fixed relationship.

The ends of the angle portions 28a of the heating element 28 are carried into a ceramic block 33 where they are connected to male electrical contacts or prongs 34 which protrude outwardly from the ceramic block 33 in parallel spaced relationship. A metal strap member 30 is secured by a nut and bolt assembly 32 to the ceramic block 33. The strap member 30 has a vertical portion and a horizontal portion roughly forming a cross. The horizontal portion of the strap member 30 embraces and firmly holds the ends of the angle portions 28a of the heating element 28 so as to securely anchor the same to the block 33. Nut and bolt assemblies 31 extending through the strap member 30 help clamp the strap member 30 to the ends of the angle portions 28a of the heating element 28.

Figure 7:
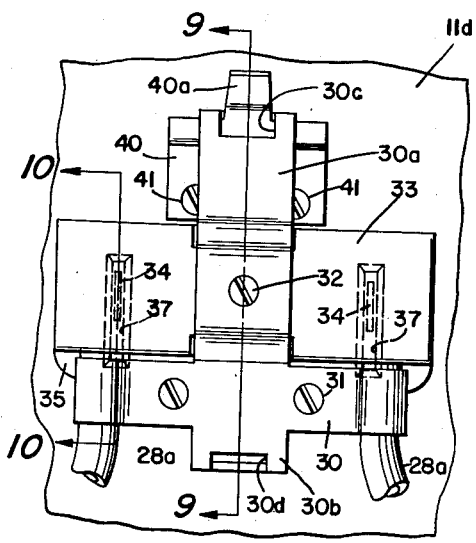
FIGURE 7 is an enlarged front view of the arrangement for mounting the heating element to the wall of the cooking device and showing the heating element positioned in one of two alternative positions.
Figure 8:
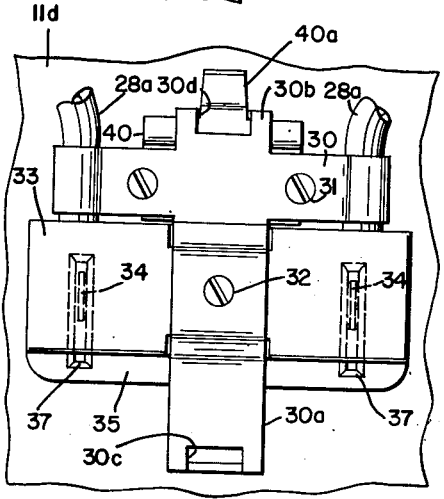
FIGURE 8 is an enlarged front view of the arrangement for mounting the heating element to the wall of the cooking device and showing the heating element positioned in another of two alternative positions.

The vertical or upright portion of the strap member 30 has a relatively long portion 30a and a relatively short portion 30b, the long portion 30a being shown as extending upwardly in FIGURE 7 and downwardly in FIGURE 8 and the short portion 30b being shown extending downwardly in FIGURE 7 and upwardly in FIGURE 8. The long portion 30a has a bent-over or hooked end as better seen in FIGURE 9 and there is a rectangular opening 30c extending through the portion 30a at the bent-over end of the portion 30a. There is also a rectangular opening 30d extending through the portion 30b at the bent-over end of the portion 30b. The portions 30a and 30b and the form of the ends thereof are substantially the same except that portion 30a is longer than portion 30b.

Figure 9:
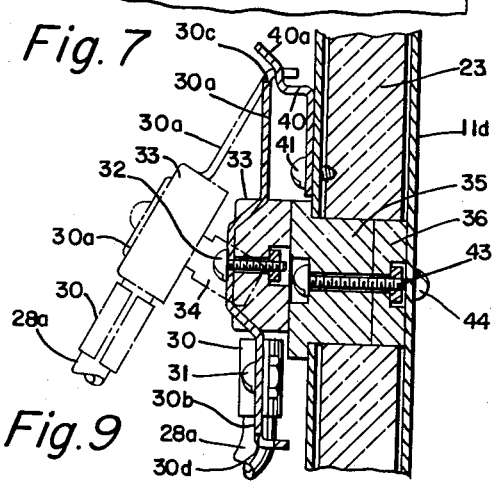
FIGURE 9 is a cross-sectional view taken through the line 9—9 of FIGURE 7 and illustrates the arrangement for mounting the heating element to the wall of the cooking device.
Figure 10:
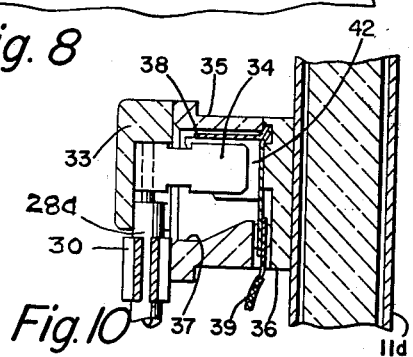
FIGURE 10 is a sectional view showing the detail of the electrical interconnection between the parts of the mounting arrangement shown in FIGURES 7, 8 and 9.

Secured to the rear wall 11d of the lower housing part 11 intermediate the bottom wall 11c and the top of the rear wall 11d is a ceramic mounting block made of block parts 35 and 36. The part 35 has a flange which overlaps the inner edge of the wall 11d. The block part 36 is secured by two spaced threaded bolts 44 to the rear wall 11d, the heads of the screw bolts 44 engaging the rear surface of the rear wall 11d holding the block part 36 is position. A nut and bolt assembly 43 extending through the block parts 35 and 36 hold the block parts together and thus secure the ceramic block made up of parts 35 and 36 securely to the rear wall 11d. Secured to the rear wall 11d of the lower housing part 11 inwardly of the housing and just above the block part 35 is a metallic hook member 40. This hook member 40 is secured by screws 41 to the rear wall 11d. The upper end of the hook member 40 is formed into a hooked tongue portion 40a which is smaller than the rectangular openings 30c and 30d in the strap member 30. The bent-over ends of the strap member 30 are arranged to hook over and interengage with the tongue portion 40a as illustrated in FIGURES 7, 8 and 9. The parts may be engaged and disengaged by swinging the ceramic block 33 and strap member 30 to the position shown in broken lines in FIGURE 9, which permits the ready disengagement of the strap member 30 on the hook member 40. Either the long portion 30a may be interengaged with the tongue portion 40a, as seen in FIGURES 7 and 9, or alternatively, the short portion 30b may be interengaged with the tongue portion 40a, as seen in FIGURE 8. The alternative positions are obtained by inverting the heating element to either direction with the angle portions 28a upwardly or downwardly relative to the horizontal major portion of the heating element.

The ceramic block 35 has a pair of female sockets 37 spaced apart in parallel relationship and corresponding to the spacing of the male prongs 34. Each female socket 37 has mounted therein a contact element 42 which is connected by wires 39 to a cord entering the cooking device and which, in turn, is adapted to be connected to a source of electrical energy. Each contact element 42, of course, is connected to a different wire of the electrical circuit of the cord connected to the cooking device. A V-shaped spring 38 straddling each contact element 38 tends to resiliently press the sidewings of the contact elements 42 together so as to embrace a prong 34 in good electrical engagement upon entering of the prongs 34 in a respective female socket 37.

By the arrangement described and shown, the major portion of the heating element 28 in a horizontal plane may be disposed at alternative levels, as for example at a lower level below the pan 25, are illustrated in FIGURE 2. Also the major portion of the heating element 28 in a horizontal plane may be disposed in an upper level and above the plane of the lower grill 26. When placed in the upper level above the grill 26, the cooking device is utilizable as a broiler for broiling food on the grill 26, that is, by locating heat above the food to be cooked. Upon placing the heating element at a lower level, then the bottom of the pan 25 receives the heat and the device may then be used as a grill for cooking food on the pan 25 or on the grill 26 by subjecting it to heat from below. Also with the heating element in its lower position, as shown in FIGURE 2, the device may be used as an oven by placing food to be baked on the upper grill 27 and lowering the upper housing part 12 to its position shown in FIGURE 1. Thus, the device may be selectively used as a grill, as a broiler, and as an oven. The ready change of the location of the heating element to one level or another permits the device to be readily converted from one type of cooking device to another. The same electrical connection is made by simply inverting the heating element and by connecting either the portion 30a to the tongue portion 40a or by connecting the portion 30b to the tongue portion 40a. In each alternative position, the heating element is reversed so that the angle portions 28a either project in one direction, as seen in FIGURE 7, or project in an opposite direction, as seen in FIGURE 8. In both cases, the prongs 34 are in electrical engagement with the electrical connecting contact elements 38 in the female sockets 37. When the parts are shown as illustrated in FIGURE 7, then the major portion of the heating element is in the lower level of the cooking device. When the parts are in the arrangement shown in FIGURE 8, then the major portion of the heating element 28 is located at the upper level such as for the broiling arrangement of the cooking device.

The arrangement illustrated and disclosed provides for versatility in arranging the parts of the cooking device and for obtaining a plurality of cooking arrangements and uses.

The present disclosure includes that contained in the appended claims as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. A cooking device comprising the combination of a housing having an upright wall, a first connecting member carried by said upright wall and having electrical terminal portions adapted to be connected to a source of electrical energy, said first connecting member having an abutting portion disposed in an upright plane and a hook portion disposed above said abutting portion and protruding inwardly of said housing, a support carried by the housing for supporting food to be cooked in a reference plane, an electrical resistance heating element having a major portion thereof disposed in a substantially flat plane, a second connecting member having electrical terminal portions connected in circuit with said heating element to energize the heating element upon connecting said terminal portions with a source of electrical energy, said second connecting member having an abutting portion adapted to engage the abutting portion of the first connecting member in a substantially upright plane and a first hanger portion and a second hanger portion extending upwardly and downwardly, respectively, from said abutting portion of the second connecting member, the electrical terminal portions of the second connecting member extending in a plane offset from said flat plane of the resistance heating element and being disposed to electrically interengage with the electrical terminal portions, respectively, of the first connecting member, said heating element being selectively mountable upon reversing in planes above and below said reference plane by positioning the resistance heating element to interengage a selected hanger portion of said first and second hanger portions of the second connection member with said hook portion of the first connecting member and to interengage said abutting portions and simultaneously electrically interengage the respective electrical terminal portions of the first and second connecting members, the electrical terminal portions being electrically interengageable upon the resistance heating element being positioned in either the plane above or the plane below said reference plane.

2. A cooking device comprising a housing having an upright wall, said upright wall having a reference axis extending therethrough and disposed in a reference plane normal to the plane of said upright wall, a first abutting member carried by said upright wall and having a first engaging surface inwardly of the housing disposed in a substantially upright plane, said abutting member having a pair of spaced recesses extending inwardly thereof from said surface equidistantly from said reference axis, a pair of first electrical contact members each disposed in a said recess and adapted to be connected to a source of electrical energy, an electrical resistance heating member having a heating portion disposed in a substantially flat plane, a second abutting member carried by the heating member and disposed substantially normal to, and arranged on a first side of, said flat plane, said second abutting member having a second engaging surface adapted to abut and engage said first engaging surface in said upright plane, a pair of second electrical contact members in electrical circuit connection with said electrical resistance heating member for energizing the same, said second electrical contact members protruding along parallel axes from said second engaging surface and being spaced in correspondence with the spacing of the first electrical contact members, said second electrical contact members being complementary to the first electrical contact members to interengage therewith in opposite of alternative dispositions of said second electrical contact members relative to the first electrical contact members, a supporting member carried by said upright wall and protruding inwardly of said housing above said first abutting member, and a pair of engaging members carried by said heating member and protruding therefrom on opposite sides of a plane coinciding with the said parallel axes of said second electrical contact members, each of said engaging members being selectively interengageable with said supporting member, the heating portion of said heating member being positionable in alternative locations above and below said reference plane by turning of the heating member relative to said reference axis and by the interengagement of the upper of the engaging members with said supporting member, the interengagement of the engaging surfaces of the respective abutting members and the interengagement of the first and second contact members, respectively, in alignment with each other, providing electrical energization therefor.

3. A cooking device comprising the combination of housing means, support means carried by the housing means for supporting food to be cooked in a substantially horizontal plane above the bottom of the housing, an electric resistance heating memer having a major portion disposed in a substantially flat plane, first bracket means carried by said housing for supporting said heating member relative to said support means, first electrical means having spaced electrical terminal portions carried by the housing means adjacent said bracket means and adapted to be connected to a source of electrical energy, second bracket means extending from said heating member and disposed normal to said flat plane and disposed to one side of said flat plane, second electrical connecting means having spaced electrical terminal portions carried by said heating member and electrically connected to said heating member to supply electrical energy thereto for heating the same, said first bracket means and said second bracket means having complementary interengaging means carried thereby to provide for securing the second bracket means to said first bracket means, the interengaging means carried by the second bracket means being disposed on both of opposite sides of the said flat plane of the heating member to be alternately engageable with the interengaging means carried by the first bracket means upon selectively inverting the heating member to direct the second bracket means either upwardly or downwardly, the selective inversion of the heating member and interengagement of the interengaging means of the respective bracket means alternately positioning the said major portion of the heating member in alternate locations above and below said horizontal plane, the electrical terminal portions of the first and second electrical connecting means, respectively, being arranged to electrically interengage upon interengagement of the first and second bracket means in both of the alternate positions of the heating member to supply electrical energy to the heating member for generating heat in either of said alternate locations.

4. A cooking device comprising a lower housing having a bottom wall, spaced side walls and a rear wall, an upper housing having a top wall, spaced side walls, and a front wall, said lower and upper housings together forming an enclosed heating space upon positioning of the upper housing on the lower housing, detachable pivot means interengaging said upper and lower housings to permit the upper housing to pivotally swing to uncover the said heating space and selectively to permit the upper housing to be detached from the lower housing, a support carried by the lower housing in a plane above said bottom wall to support food to be cooked, an electrical resistance heating member having a major portion disposable in a substantially horizontal plane said open space for cooking food on said support, said heating element having an arm portion disposed at a substantially right angle to said major portion and extending from a side thereof, said heating member being positionable in alternate inverted positions to direct said arm portion upwardly from said major portion and to direct said arm portion downwardly from said major portion, said arm portion having a first pair of spaced electrical contact members electrically connected in circuit with said heating element and having first engaging means extending therefrom, a second pair of spaced electrical contact members carried by said rear wall and accessible from said enclosed heating space, said second pair of spaced electrical contact members being adapted to be connected to a source of electrical energy and being interengageable with the contact members, respectively, of said first pair of contact members, and second engaging means carried by said rear wall and accessible from said enclosed heating space, said first and second engaging means being interengageable in both of said alternate inverted positions to support the major portion of the heating member in alternate upper and lower positions in said open space to vary the position of said major portion relative to said support.

5. A cooking device comprising housing means defining a cooking space, support means for supporting food in said space in a substantially horizontal plane, electrical resistance heating means for providing heat in said space, bracket means carried by the housing means for supporting said heating means in said space, arm means extending at a right angle from the heating means on a side thereof and adapted to interengage with said bracket means in both of alternative positions of the heating means to maintain the position of the heating means relative to the said support means, said heating means being positionable in a first alternative position with said arm means directed downwardly to raise the heating means relative to said support means and being positionable in a second alternative position with said arm means directed upwardly to lower the heating means relative to said support means, and interengageable electric contact means carried by said housing adjacent said bracket means and by said heating means adjacent said arm means for providing electrical connection between said heating means and a source of electrical energy, the said interengageable contact means being interengageable in a fixed plane relative to said horizontal plane in alternative inverted positions of the contact means carried by said heating means to provide for interengagement with the contact means carried by the housing in both of said alternate positions of the heating means.

6. A cooking device comprising a lower housing, an upper housing invertable over the lower housing to enclose an open space therebetween, said lower housing having a rear wall and spaced side walls, said rear wall and spaced side walls forming at the rear corners of the lower housing a pair of spaced inclined surfaces extending downwardly from the top of the rear wall to the tops of the side walls, respectively, a pair of open pivot supporting members carried by said side walls adjacent the bottom of said inclined surfaces and open from above said inclined surfaces, said upper housing having a rear wall and a pair of spaced side walls, a pair of spaced pivot pins carried by the said spaced side walls of the upper housing at a distance from said rear wall and directed toward each other, said pivot pins being slidable on said inclined surfaces into siad open pivot supporting members, respectively, to provide spaced pivot connections between said housings upon lowering of the upper housing in inverted position upon said lower housing, food support means carried by the lower housing in said open space, and electrical resistance heating means carried by the lower housing in juxtaposition to said food support means for cooking food supported thereon.

7. The combination of first and second housing means for enclosing a space for cooking food therein, pivot means joining said first and second housing means for pivotally swinging said second housing means relative to said first housing means, said pivot means being readily detachable by raising the second housing means away from said first housing means, support means carried by the first housing means for supporting food in said space, electrical resistance means for heating food in said space, mounting means carried by said first housing means at a side of said space for supporting said heating means, first and second connecting means carried by said heating means and extending in opposite directions at a side of the heating means, said first connecting means being connectable to said mounting means upon disposing the heating means with one side thereof directed upwardly and said second connecting means being connectable to said mounting means upon disposing an opposite side thereof directed upwardly, said first and second connecting means benig so positioned relative to said heating means that upon connection of the first connecting means to said mounting means the heating means is disposed below a horizontal reference plane and upon connection of the second connecting means to said mounting means the heating means is disposed above a horizontal reference plane and the opposite sides thereof are reversely disposed, a female electrical socket carried by said first housing means and having terminal axes disposed substantially in said horizontal reference plane, and male electrical prongs electrically connected to said heating means and complementarily interengageable with said socket in said horizontal reference plane in both the dispositions of the heating means below and above said horizontal reference plane, said prongs being disposed in a plane intermediate of said first and second connecting means.

8. The combination of two hollow open-sided shells disposed in opposition to each other to confine a space therebetween for cooking food therein, pivot means interconnecting said shells to permit one shell to swing upwardly on a horizontal axis relative to said other shell to expose said space means for separating said shells by raising the pivot means connected to said one shell from the pivot means connected to said other shell, electrical resistance heating means for providing heat in said space to cook food therein, said heating means being invertable to two alternate positions above and below a reference plane in said space, oppositely directed connecting members carried by said heating means, and supporting means carried by the said other shell selectively engageable with alternate of said connecting members for supporting said heating means selectively in said alternate positions above and below said reference plane, said supporting means including a hook portion disposed above said reference plane and engageable alternatively by said first and second connecting members, female electrical socket means having parallel axes disposed in said reference plane adapted to be connected to a source of electrical energy, and male electrical prong means carried by and electrically connected with said heating means, said prong means being interengageable with said socket means to energize said heating means upon connecting either one of said connecting members with said hook portion of the supporting means, a first of said connecting members being engageable by said hook portion upon the heating means having a first side disposed upwardly and a second of said connecting members being engageable by said hook portion upon reversing the heating means to dispose said first side downwardly, the said heating means being offset from the plane of said prong means to dispose the heating means above and below said reference plane in accordance with the selective alternate engagement of the first connecting member or second connecting member with said hook portion.

References Cited in the file of this patent

UNITED STATES PATENTS

| | | |
|---|---|---|
| 1,798,763 | Smith | Mar. 31, 1931 |
| 2,168,604 | Lee | Aug. 8, 1939 |
| 2,956,497 | Bernstein | Oct. 18, 1960 |